(12) United States Patent
Sunabashiri et al.

(10) Patent No.: US 6,231,070 B1
(45) Date of Patent: May 15, 2001

(54) STRUCTURE AND METHOD FOR FOLDING AIR BAG

(75) Inventors: Yukisaka Sunabashiri, Tokyo; Hiroshi Sasaki, Hokkaido; Kasumi Seo, Kanagawa-ken, all of (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 09/308,410

(22) PCT Filed: Sep. 18, 1998

(86) PCT No.: PCT/JP98/04229

§ 371 Date: Aug. 6, 1999

§ 102(e) Date: Aug. 6, 1999

(87) PCT Pub. No.: WO99/15372

PCT Pub. Date: Apr. 1, 1999

(30) Foreign Application Priority Data

Sep. 19, 1997 (JP) .................................................. 9/255630

(51) Int. Cl.[7] .............................. B60R 22/16; B60R 21/22
(52) U.S. Cl. ...................................... 280/730.2; 280/743.1

(58) Field of Search ............................... 280/730.2, 730.1, 280/743.1

(56) References Cited

U.S. PATENT DOCUMENTS

| 5,667,243 |   | 9/1997  | Fisher et al. |           |
|-----------|---|---------|---------------|-----------|
| 5,803,485 | * | 9/1998  | Acker et al. .................. | 280/730.2 |
| 5,868,420 | * | 2/1999  | Higashiura et al. ............. | 280/730.2 |
| 5,899,490 | * | 5/1999  | Wipasuramonton et al. ..... | 280/730.2 |
| 6,065,772 | * | 5/2000  | Yamamoto et al. .............. | 280/730.2 |
| 6,142,507 | * | 11/2000 | Okuda et al. .................... | 280/730.2 |

FOREIGN PATENT DOCUMENTS

| 798170   | 10/1997 | (EP) . |
| 9-123864 | 5/1997  | (JP) . |
| 9-136598 | 5/1997  | (JP) . |

* cited by examiner

Primary Examiner—Paul N. Dickson
(74) Attorney, Agent, or Firm—McDermott, Will & Emery

(57) ABSTRACT

A head protecting portion (B) is rolled a plurality of times with a protection surface (Sb) thereof inside, and the head protecting portion (B) is pushed inside a chest protecting portion (A), when also a part (C) of the chest protecting portion (A) connected to the head protecting portion (B) is pushed inside the chest protecting portion (A).

12 Claims, 7 Drawing Sheets

FIRST STEP

SECOND STEP

THIRD STEP

FOURTH STEP

FIFTH STEP

SIXTH STEP

SEVENTH STEP

FINAL STEP

FIFTH STEP

SIXTH STEP

FINAL STEP

STRUCTURE AND METHOD FOR FOLDING AIR BAG

TECHNICAL FIELD

The present invention relates to a folding structure and a folding method for an airbag.

BACKGROUND ART

As an airbag for vehicles, there is an airbag for lateral collision adapted, upon a lateral collision of a vehicle, to spread forwards from a side of the backrest to protect a passenger. (A similar art is disclosed in Japanese Patent Application Laid-Open Publication No. 9-136598.)

When spread, such a type of airbag has a generally L-shape external configuration partitioned by an internal partition cloth into a head protecting upper portion and a chest protecting lower portion. The airbag has a proximal end provided with an inflator. Discharged gas from a discharge port at a side of the inflator first enters the chest protecting portion, spreading this forwards, and then rushes through a communication hole across the partition cloth inside the head protecting portion, spreading this upwards.

Such an airbag for lateral collision needs to have a chest protecting portion quickly spread into a relatively narrow spacing between a passenger and a side wall of a vehicle body, as well as an implementation to avoid, when spreading, interferences such as with the vehicle body's side wall, for example.

The action and speed of the spreading of an airbag depends on how the airbag is folded.

To this point, it is desirable to propose a folding structure and a folding method for an airbag, allowing an improved spreading speed, as well as for the action of spread to be smooth without failure due to an interference with a vehicle body side wall.

DISCLOSURE OF THE INVENTION

The present invention has been achieved with such points in view, to provide a folding structure and a folding method for an airbag, permitting an improved spreading speed and a smooth spread action.

An embodiment of the present invention provides a folding structure for an airbag with a generally L-shape spread external configuration having a chest protecting portion and a head protecting portion provided with protection surfaces for a chest protection and a head protection when spread, in which the head protecting portion is rolled a plurality of times with the protection surface thereof inside, and the head protecting portion is pushed inside the chest protecting portion.

In another aspect, the invention provides a folding method for an airbag with a generally L-shape spread external configuration having a chest protecting portion and a head protecting portion provided with protection surfaces for a chest protection and a head protection when spread, comprising rolling the head protecting portion a plurality of times with the protection surface thereof inside, and pushing the head protecting portion inside the chest protecting portion.

According to the aspects of the invention, an airbag with a generally L-shape spread external configuration has a chest protecting portion and a head protecting portion provided with a "protection surface for a head protection or for a chest protection when spread" (hereinafter sometimes called "passenger side surface" or simply "passenger side"), and when folding, the head protecting portion is rolled a plurality of times with the passenger side inside. The head protecting portion, which has been neatly folded into a rolled form, is pushed inside the chest protecting portion.

When the airbag spreads, from the chest protecting portion to be spreading at a high speed the rolled form of the head protecting portion is sprung out at a higher speed and, like a cloth roll forcibly thrown on a floor for example, agilely unfolds straight in an extending direction along a vehicle body side wall or the like with a width of a roll diameter, and even if more or less obstacles are present at the back side, rolls to spread over them, concurrently inflating for development.

Accordingly, even in the case of development of the airbag in a relatively narrow spacing between a passenger and the vehicle body side wall, the head protecting portion is spread smooth and swiftly without being impeded by interference with interior appliances or the like on the vehicle body side wall. Further, also the chest protecting portion connected to the head protecting portion spreads swiftly, allowing for the passenger to be protected in an initial phase of a lateral collision of vehicle.

It is noted that the chest protecting portion may preferably be rolled a plurality of times with the protection surface thereof inside, whereby the chest protecting portion having a rolled form of the head protecting portion pushed therein is rolled plural times with its passenger side inside, and in addition to the effect described, a final fold size of the airbag becomes reduced, to be favorable for installation in a backrest which has a small accommodation space.

Further, a part of the chest protecting portion connected to the head protecting portion may preferably be pushed inside the chest protecting portion, whereby a portion of the chest protecting portion at the head protecting portion side is pushed, together with the head protecting portion pushed therein, inside the chest protecting portion, and a fold size of an entirety of the airbag becomes reduced, allowing for the chest protecting portion to spread with ease in a small spacing between the passenger and the vehicle body side wall and further for the head protecting portion to be sprung out with an increased initial speed, permitting the more rapid development.

BEST MODE FOR CARRYING OUT THE INVENTION

Figure 1:
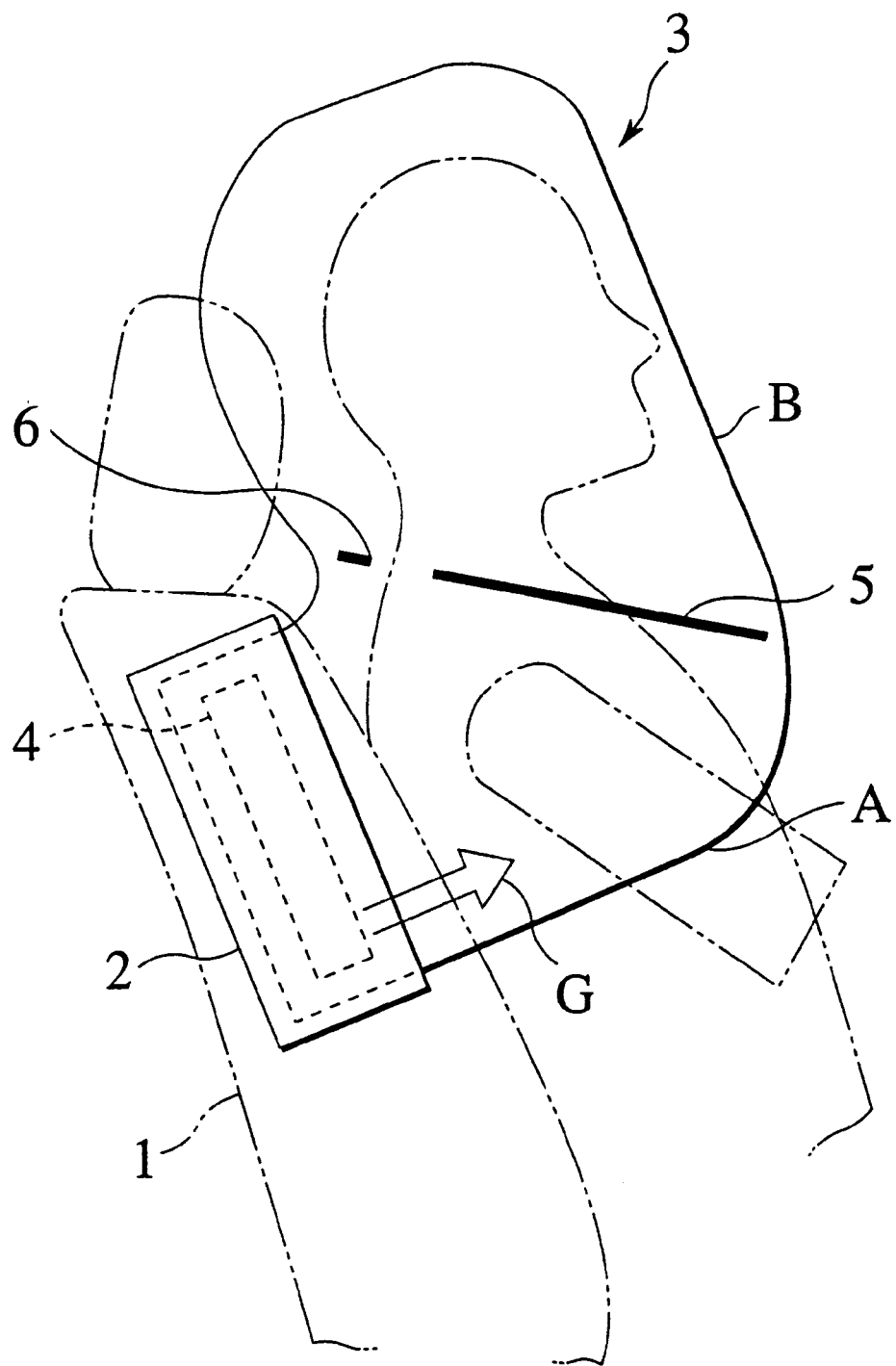
FIG. 1 is a side view illustrating an airbag apparatus in accordance with a first embodiment of the invention.

There will be described below preferred embodiments of the invention with reference to the drawings.

FIGS. 1 to 10 show a first embodiment of the invention. First, with reference to FIG. 1, a structure of an airbag apparatus will be described. Designated by reference numeral 1 is a backrest of a right front seat, which has at its right end an airbag module 2 incorporated therein. The air bag module 2 has an airbag 3 and an inflator 4 accommodated therein. The airbag 3 is housed in the airbag module 2, in a later-described fold state. The airbag 3 is adapted, upon a lateral collision of a vehicle, for a spreading inflation between a passenger and a vehicle body side wall, to protect the passenger.

The airbag 3 has a generally L-shaped external configuration when spread, which is separated into a chest protecting lower portion A and a head protecting upper portion B by provision of a cloth 5 as an internal partition. A communication hole 6 is formed at a rear side of the partition cloth 5.

At a side of the inflator 4, in a lower end part, there is formed a discharge port 7, and discharged gas G from the discharge port 7 first enters the chest protecting portion A, causing the chest protecting portion A to spread forwards, and thereafter the gas G in the chest protecting portion A is introduced through the communication hole 6 inside the head protecting portion B, causing the head protecting portion B to spread upwards.

Next, there will be described how to fold the airbag 3 inside the airbag module 2, with reference to FIGS. 2 to 10.

Figure 2:
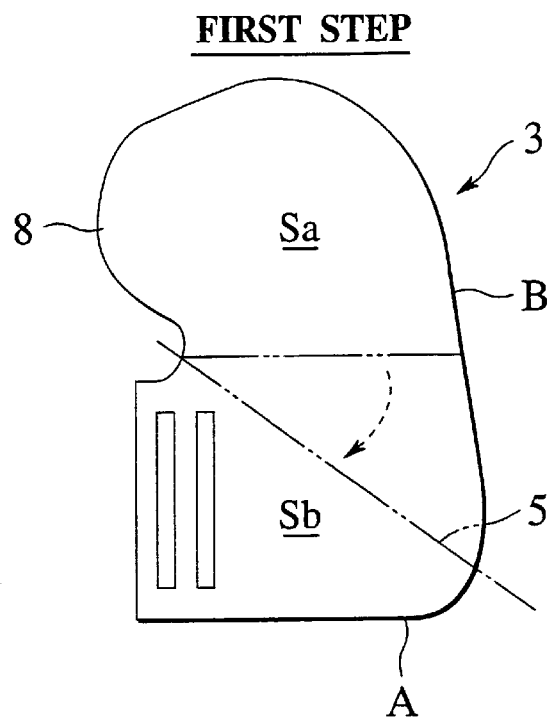
FIG. 2 is a side view of an airbag illustrating a first step of folding.

At a first step, as illustrated in FIG. 2, a part of the head protecting portion B is pushed inside the chest protecting portion A from position of the partition cloth 5. This step is for correcting an orientation of the head protecting portion B slightly inclined rearwards, and constitutes a preparation step to facilitate a rolling operation thereafter. In the drawings, designated by a reference character Sa is a passenger side surface of the chest protecting portion A, and Sb is a passenger side surface of the head protecting portion B.

Figure 3:
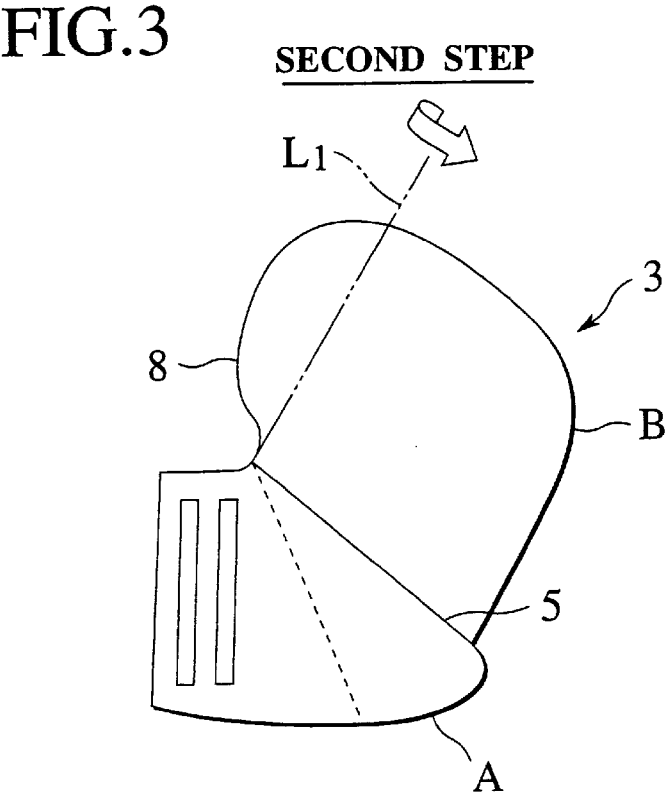
FIG. 3 is a side view of the airbag illustrating a second step of folding.

At a second step, as illustrated in FIG. 3, a rearwardly projecting part 8 of the head protecting portion B is folded back at a fold line L1 onto the passenger side. This step also constitutes a preparation step to facilitate the rolling operation thereafter.

Figure 4:
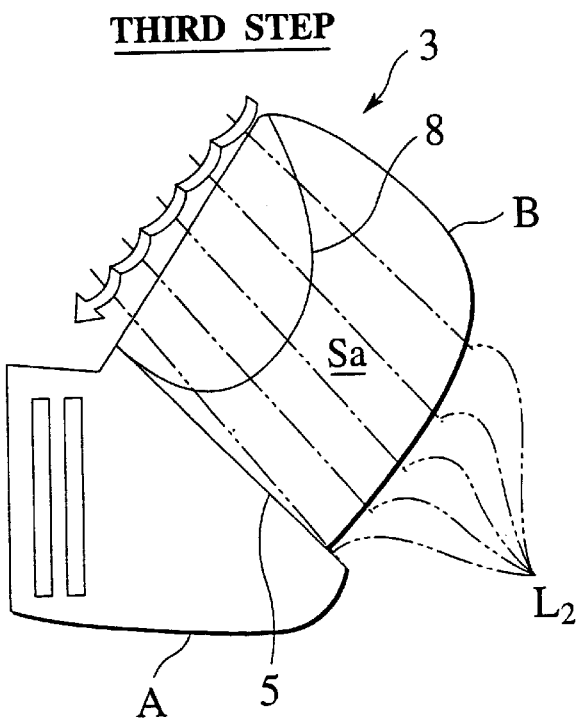
FIG. 4 is a side view of the airbag illustrating a third step of folding.

At a third step, as illustrated in FIG. 4, the head protecting portion B configured into a substantially rectangular form through the first and second steps is rolled five times in accordance with five enroll lines $L_2$ as references, toward the passenger side, so that the head protecting portion B is configured in a roll.

Figure 5:
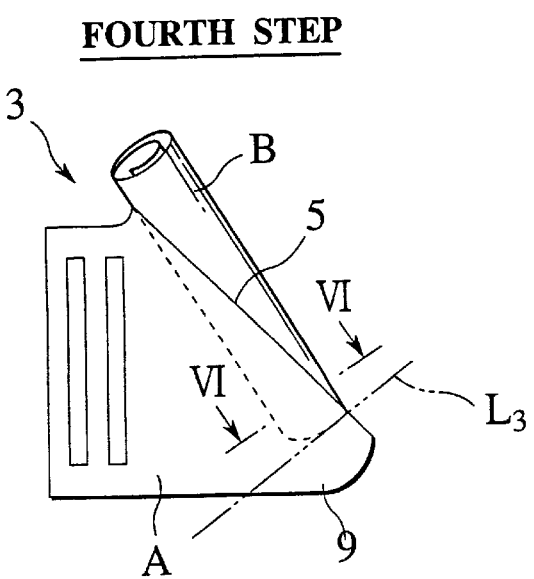
FIG. 5 is a side view of the airbag illustrating a fourth step of folding.
Figure 6:
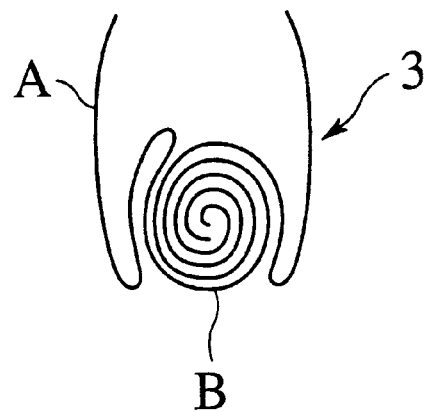
FIG. 6 is a section along a line VI—VI of FIG. 5.

At a fourth step, as illustrated in FIGS. 5 and 6, the head protecting portion B rolled up in a roll is pushed inside the chest protecting portion A. FIG. 6 illustrates a section taken along line VI—VI of FIG. 5.

Figure 7:
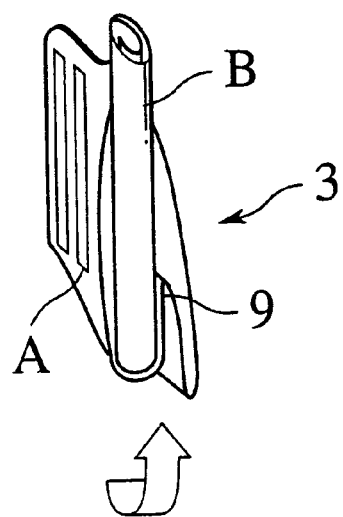
FIG. 7 is a side view of the airbag illustrating a fifth step of folding.

At a fifth step, as illustrated in FIG. 7, a lower corner part 9 of the chest protecting portion A in the fourth step is pushed between the head protecting portion B of a rolled form and the chest protecting portion A at an external side of the vehicle, from a fold line L3 in FIG. 5.

Figure 8:
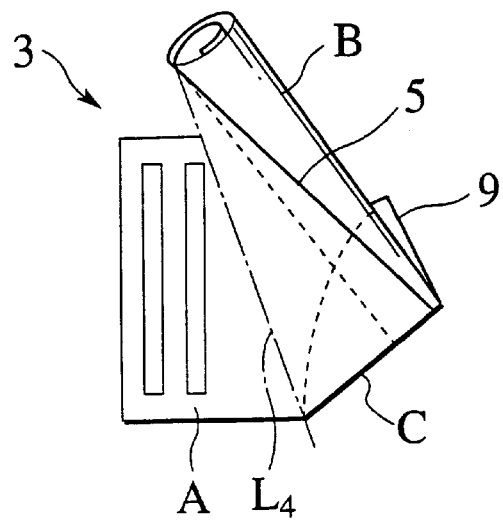
FIG. 8 is a side view of the airbag illustrating a sixth step of folding.

At a sixth step, as illustrated in FIG. 8, a part C of the chest protecting portion A connected to the head protecting portion B and ranging to a push-in line L4 is pushed, together with the head protecting portion B of a rolled form, inside the chest protecting portion A, further from the push-in line L4.

Figure 9:
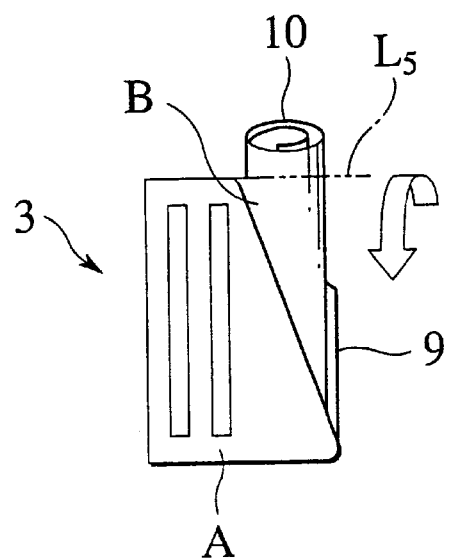
FIG. 9 is a side view of the airbag illustrating a seventh step of folding.

At a seventh step, as illustrated in FIG. 9, an upper end part 10 of the head protecting portion B rolled up in a roll is folded back at a fold line L5 onto a passenger side.

Figure 10:
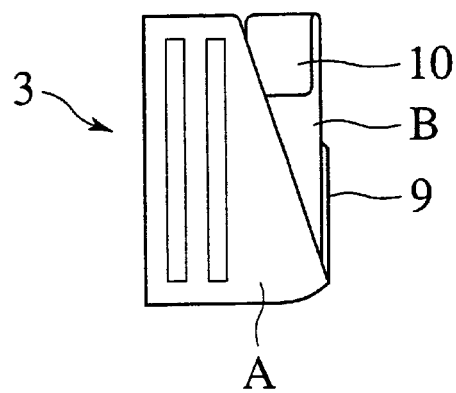
FIG. 10 is a side view of the airbag illustrating a final fold state.

By the foregoing steps, a final fold state of the airbag 3 is achieved as illustrated in FIG. 10.

According to the embodiment, the head protecting portion B is rolled a plurality of times (five times in this case) toward the passenger side (at the third step), and when the airbag 3 inflates, the head protecting portion B is caused to spread in a rolling manner along the vehicle body side wall. Accordingly, a spreading inflation of the head protecting portion B is achieved smooth 14 without being impeded by interference with interior appliances or the like on the vehicle body side wall.

Further, the head protecting portion B rolled up in a roll is pushed inside the chest protecting portion A (at the fourth step), and the head protecting portion B rolled in a roll is agilely pushed out of the chest protecting portion A, allowing a spreading inflation as described.

Further, a part of the chest protecting portion A at the head protecting portion B side is pushed, together with the head protecting portion B of a roll form, inside the chest protecting portion A, and the chest protecting portion A can spread swiftly in a narrow spacing between a passenger and the vehicle body side wall. In other words, a push-in structure allows a stuffed portion to be directly pushed out as it is, permitting a very fast spreading speed. Accordingly, even in a narrow spacing between a passenger and the vehicle body side wall, the chest protecting portion A can be spread swiftly to ensure protection of a chest of the passenger in an initial phase of a vehicle's lateral collision.

Figure 11:
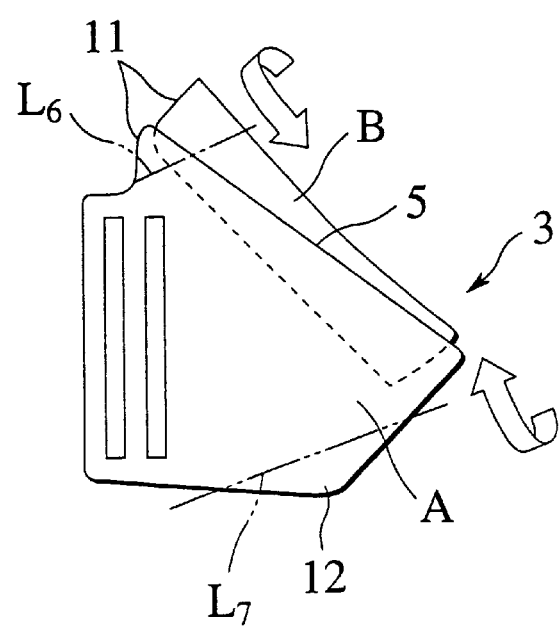
FIG. 11 is a side view of an airbag illustrating a fifth step of folding according to a second embodiment of the invention.
Figure 12:
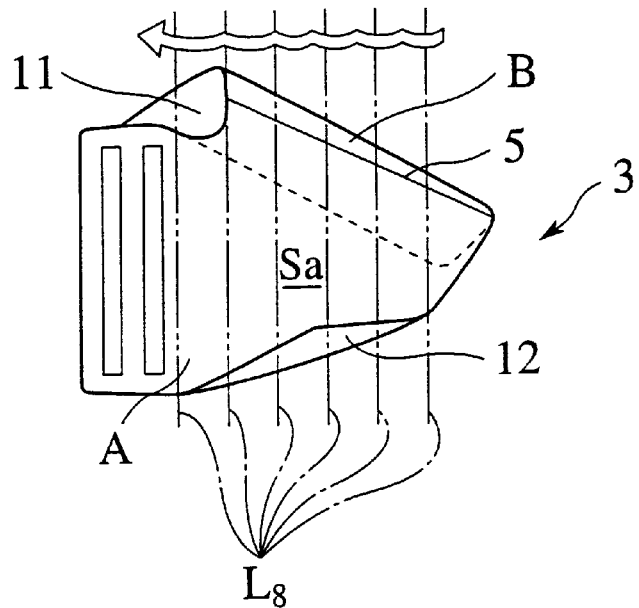
FIG. 12 is a side view of the airbag illustrating a sixth step of folding.
Figure 13:
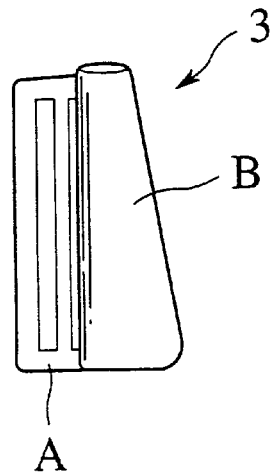
FIG. 13 is a side view of the airbag illustrating a final fold state.

FIGS. 11 to 13 show a second embodiment of the invention, which will be described below, assuming that there have already been exercised like steps to the first embodiment, up to a fourth step of pushing a head protecting portion B inside a chest protecting portion A.

Then, at a fifth step, as illustrated in FIG. 11, an upper corner 11 and a lower corner 12 are folded back at fold lines L6 and L7, respectively, onto a passenger side.

At a sixth step, as illustrated in FIG. 12, the chest protecting portion A after the fifth step is rolled five times in accordance with five enroll lines L8 as references, to be wound in a roll.

By the foregoing steps, there is achieved a final fold state of an airbag 3 as illustrated in FIG. 13.

According to the second embodiment, the head protecting portion B is once rolled up in a roll and pushed inside the chest protecting portion A, like the first embodiment, and additionally thereafter, also the chest protecting portion A, in which the head protecting portion B rolled up in a roll is pushed, is rolled a plurality of times toward the passenger side, and therefore the airbag 3 has a smaller final fold size than the first embodiment. Accordingly, it is favorable for application to a backrest with a small accommodation space.

INDUSTRIAL APPLICABILITY

According to the invention, a head protecting portion of an airbag is adapted to spread in a rolling manner along a vehicle body side wall, permitting a smooth spreading inflation of the airbag. Accordingly, the invention is extremely useful for an airbag for vehicles.

What is claimed is:

1. A folding structure for an airbag with a generally L-shape spread external configuration having a chest protecting portion and a head protecting portion provided with protection surfaces for a chest protection and a head protection when spread, in which:

the head protecting portion is rolled a plurality of times with the protection surface thereof inside; and the head protecting portion is pushed inside the chest protecting portion.

2. A folding structure for an airbag according to claim 1, wherein the chest protecting portion is rolled a plurality of times with the protection surface thereof inside.

3. A folding structure for an airbag according to claim 1, wherein a part of the chest protecting portion connected to the head protecting portion is pushed inside the chest protecting portion.

4. A folding method for an airbag with a generally L-shape spread external configuration having a chest protecting portion and a head protecting portion provided with protection surfaces for a chest protection and a head protection when spread, comprising:

rolling the head protecting portion a plurality of times with the protection surface thereof inside; and pushing the head protecting portion inside the chest protecting portion (A).

5. A folding method for an airbag according to claim 4, further comprising rolling the chest protecting portion a plurality of times with the protection surface thereof inside.

6. A folding method for an airbag according to claim 4, further comprising pushing a part of the chest protecting portion connected to the head protecting portion inside the chest protecting portion.

7. An airbag device for use in a vehicle, comprising an inflator;

an airbag connected to the inflator, the airbag including:
　a chest protecting portion in fluid communication with the inflator and having a protection surface; and
　a head protecting portion in fluid communication with the chest protecting portion and having a protection surface, wherein the airbag is substantially L-shaped when not folded, and wherein the airbag is folded such that the head protecting portion is rolled a plurality of times with the protection surface facing inward and the head protecting portion is pushed inside the chest protecting portion; and a module surrounding the inflator and the airbag and that is adapted to be installed in a vehicle.

8. An airbag device as claimed in claim 7, wherein, with the head protecting portion pushed inside the chest protecting portion, the chest protecting portion is rolled a plurality of times with its protection surface facing inward.

9. An airbag device module as claimed in claim 8, wherein the airbag further includes a connecting portion connecting the chest protecting portion and the head protecting portion, and wherein the connecting portion is pushed inside the chest protecting portion.

10. A method for folding an airbag having a chest protecting portion and a head protecting portion and being substantially L-shaped when unfolded, the method comprising:

laying the airbag flat;

pushing a portion of the head protecting portion into the chest protecting portion;

folding a rearward projecting portion of the head protecting portion onto the passenger side of the head protecting portion such that the head protecting portion is now in a substantially rectangular shape;

rolling the head protecting portion a plurality of times toward the passenger side of the head protecting portion such that the head protecting portion is roll-shaped and the passenger side of the head protecting portion faces inward; and pushing the head protecting portion into the chest protecting portion.

11. A method of folding an airbag as claimed in claim 10, further comprising:

pushing a lower corner of the chest protecting portion between the head protecting portion and an external side of the chest protecting portion;

pushing a connection of the chest protecting portion and a head protecting portion further into the chest protecting portion; and folding the head protecting portion toward the passenger side.

12. A method of folding an airbag as claimed in claim 10, further comprising:

folding an upper corner of the rolled head protecting portion and a lower corner of the chest protecting portion toward the passenger side; and rolling the chest protecting portion a plurality of times toward the passenger side such that the passenger side faces inward.

* * * * *